(12) United States Patent
Huang

(10) Patent No.: US 11,089,866 B2
(45) Date of Patent: Aug. 17, 2021

(54) FOLDING STAND FOR ELECTRONIC DEVICE

(71) Applicant: Cheng Yu Huang, New Taipei (TW)

(72) Inventor: Cheng Yu Huang, New Taipei (TW)

( * ) Notice: Subject to any disclaimer, the term of this patent is extended or adjusted under 35 U.S.C. 154(b) by 93 days.

(21) Appl. No.: 16/553,316

(22) Filed: Aug. 28, 2019

(65) Prior Publication Data

US 2021/0062965 A1 Mar. 4, 2021

(51) Int. Cl.
*A47B 23/00* (2006.01)
*F16M 11/38* (2006.01)
*A47B 23/04* (2006.01)
*A47B 21/03* (2006.01)

(52) U.S. Cl.
CPC ........... *A47B 23/001* (2013.01); *F16M 11/38* (2013.01); *A47B 21/0314* (2013.01); *A47B 2021/0321* (2013.01); *A47B 2021/0364* (2013.01); *A47B 2023/049* (2013.01)

(58) Field of Classification Search
CPC ...... A47B 2021/0364; A47B 2023/049; A47B 2200/0026; A47B 2023/005; A47B 23/044; A47B 23/04; A47B 23/00; A47B 21/0314; A47B 2003/008; A47B 2003/0824; A47B 2003/0827; A47B 3/10; A47B 2021/0321; Y10T 403/32131; Y10T 403/32155; F16C 11/10; G06F 1/1632; F16M 11/38
USPC .................................................. 108/125, 127
See application file for complete search history.

(56) References Cited

U.S. PATENT DOCUMENTS

| | | | | |
|---|---|---|---|---|
| 1,709,927 A | * | 4/1929 | Whitney | A47B 23/001 108/18 |
| 3,123,935 A | * | 3/1964 | Williams | A47B 13/16 248/346.01 |
| D212,541 S | * | 10/1968 | Taylor | D6/642 |
| 4,311,099 A | * | 1/1982 | Roberts | A47C 7/68 108/47 |
| 4,557,200 A | * | 12/1985 | Geschwender | A47B 23/001 108/132 |
| 4,756,119 A | * | 7/1988 | Chabot | A01G 9/0299 47/39 |
| D327,200 S | * | 6/1992 | Szablak | D7/550.1 |
| 5,394,808 A | * | 3/1995 | Dutro | A47B 3/0912 108/126 |
| D385,126 S | * | 10/1997 | Howland | D6/406.6 |
| D390,718 S | * | 2/1998 | Howland | D6/406.6 |
| 6,044,758 A | * | 4/2000 | Drake | A47B 23/001 100/43 |
| 6,152,417 A | * | 11/2000 | Randall | A47B 23/001 108/43 |

(Continued)

*Primary Examiner* — Ingrid M Weinhold
(74) *Attorney, Agent, or Firm* — Demian K. Jackson; Jackson IPG PLLC

(57) ABSTRACT

A folding stand is provided with a panel (1) including two cavities (11) adjacent to two sides of a bottom respectively, two wells (12) in front and rear ends of the cavity (11) respectively; and two legs (2) each including a short part (21), an elongated part (22) formed with the short part (11), a recess (23) between the short part (21) and the elongated part (22), two pivots (24) extending forwardly and rearward from the short part (21) respectively, the pivots (24) being rotatably disposed in the wells (12) respectively, and two mounts (25) put on the pivots (24) and releasably secured to the cavities (11) respectively. The leg (2) can be retracted into the cavity (11) or extended out of the cavity (11) by pivoting with respect to the wells (12).

3 Claims, 5 Drawing Sheets

(56) References Cited

U.S. PATENT DOCUMENTS

| | | | |
|---|---|---|---|
| 6,253,688 B1 * | 7/2001 | Lor | A47B 23/001 108/129 |
| 6,694,897 B2 * | 2/2004 | Lou-Hao | A47B 3/091 108/132 |
| 7,007,612 B2 * | 3/2006 | Mallory | F16M 11/38 108/147.22 |
| 7,007,771 B2 * | 3/2006 | Rawlings | A47D 1/02 182/33 |
| 7,055,442 B2 * | 6/2006 | Podd | A47B 23/001 108/25 |
| 7,073,455 B2 * | 7/2006 | Wakazono | D05B 75/00 112/260 |
| 8,322,292 B2 * | 12/2012 | Chen | A47B 23/043 108/43 |
| D679,921 S * | 4/2013 | Kiechler | D6/406.5 |
| 8,424,464 B2 * | 4/2013 | Korpi | A47B 23/044 108/9 |
| D799,851 S * | 10/2017 | Waxman | D6/406.6 |
| D802,379 S * | 11/2017 | Raphael | D7/698 |
| 10,251,477 B1 * | 4/2019 | Huang | A47B 23/044 |
| D855,347 S * | 8/2019 | Mizrahi | D6/525 |
| D857,705 S * | 8/2019 | Hu | D14/451 |
| D892,515 S * | 8/2020 | Wang | D6/406.5 |
| 2008/0149802 A1 * | 6/2008 | Chiang | A47B 3/10 248/461 |
| 2010/0006735 A1 * | 1/2010 | Reinen | G09F 15/0062 248/451 |
| 2010/0133208 A1 * | 6/2010 | Seo, II | A47B 23/04 211/26 |
| 2010/0300334 A1 * | 12/2010 | Tcholakov | A47B 3/08 108/127 |
| 2011/0056412 A1 * | 3/2011 | Grammer | A45C 9/00 108/6 |
| 2012/0186499 A1 * | 7/2012 | Chen | A47B 23/043 108/50.13 |
| 2014/0311388 A1 * | 10/2014 | Korpi | B64D 11/00152 108/6 |
| 2020/0128953 A1 * | 4/2020 | Goldhammer | A47B 23/06 |

* cited by examiner

A-A

FOLDING STAND FOR ELECTRONIC DEVICE

BACKGROUND OF THE INVENTION

1. Field of the Invention

The invention relates to stands and more particularly to a folding stand for an electronic device (e.g., computer monitor, keyboard, tablet computer, or mobile phone).

2. Description of Related Art

Mobile electronic devices (e.g., tablet computers and smart phones) are used by people in daily lives. For watching video more comfortably, a stand is provided on a bottom of an electronic device as support.

A user may need to move the stand with the hands. When the user needs to place the electronic device on the table, the user may use one hand to hold the body of the electronic device, and the other hand to moves the stand in order to change position. However, it is inconvenient in use because the stand is not foldable.

Thus, the need for improvement still exists.

SUMMARY OF THE INVENTION

It is therefore one object of the invention to provide a folding stand comprising a panel including two cavities adjacent to two sides of a bottom respectively, two wells in front and rear ends of the cavity respectively; and two legs each including a short part, an elongated part formed with the short part, a recess between the short part and the elongated part, two pivots extending forwardly and rearward from the short part respectively, the pivots being rotatably disposed in the wells respectively, and two mounts put on the pivots and releasably secured to the cavities respectively wherein the leg is configured to retract into the cavity or extend out of the cavity by pivoting with respect to the wells.

The above and other objects, features and advantages of the invention will become apparent from the following detailed description taken with the accompanying drawings.

DETAILED DESCRIPTION OF THE INVENTION

Figure 1:
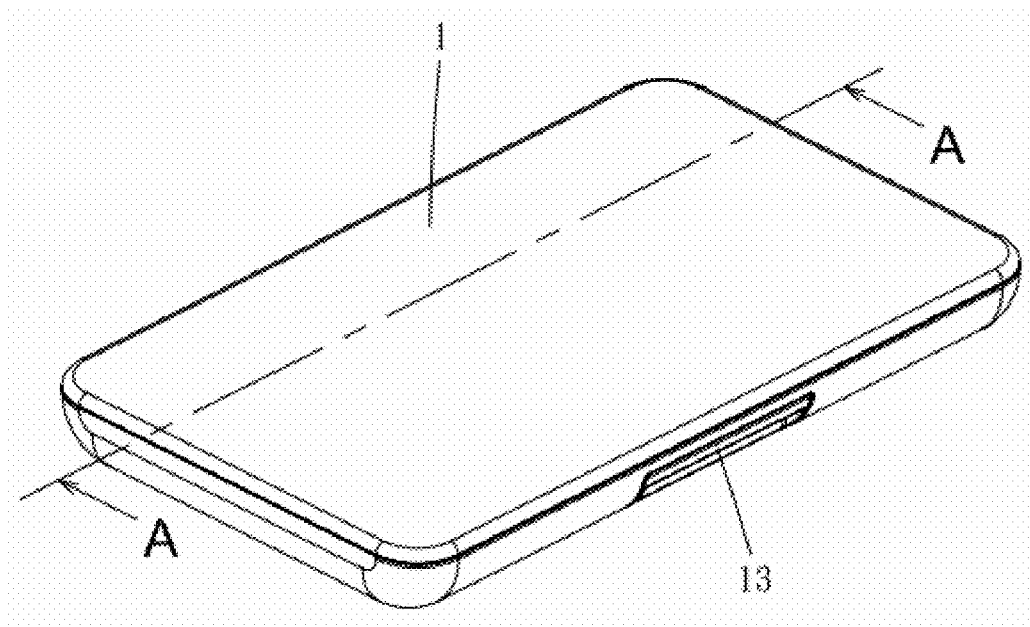
FIG. 1 is a perspective view of a folding stand according to the invention, legs of the stand being collapsed.
Figure 2:
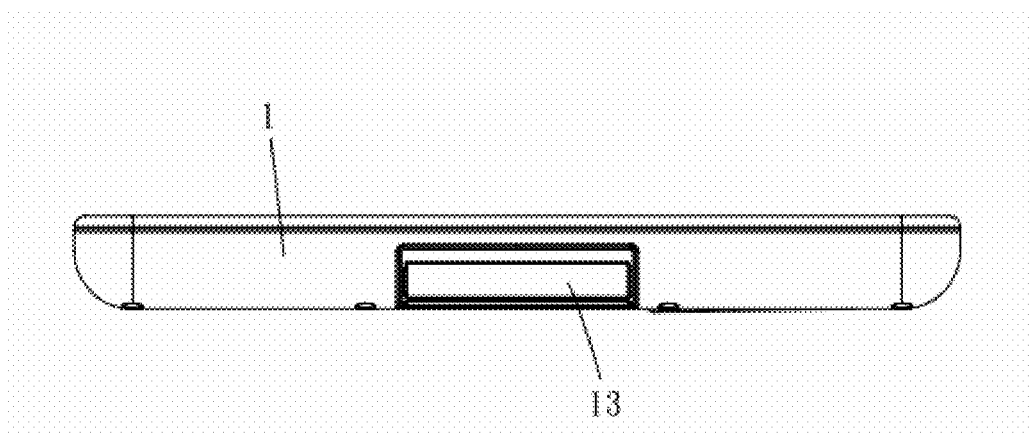
FIG. 2 is front view of FIG. 1.
Figure 3:
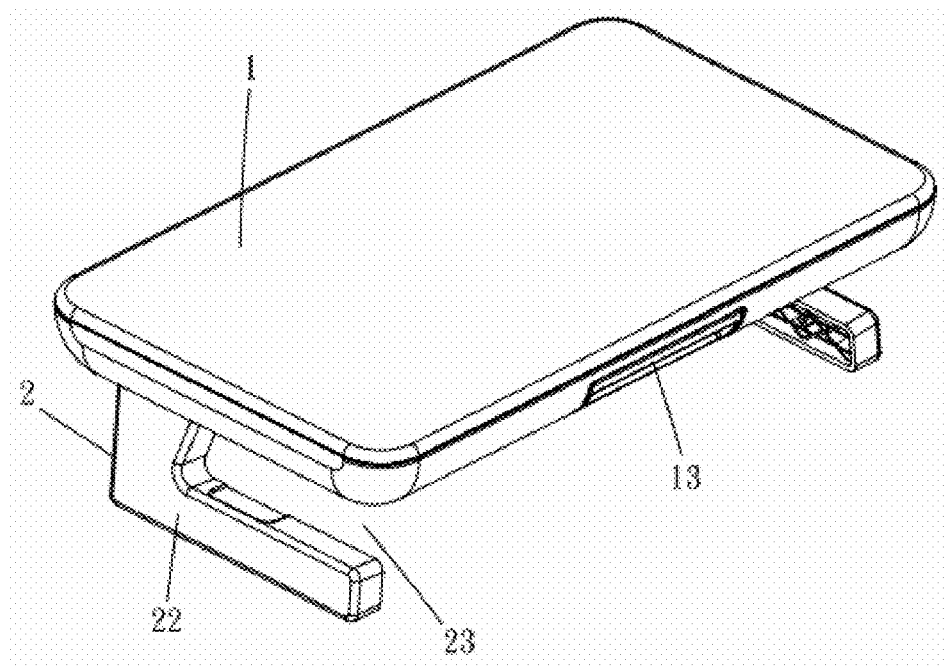
FIG. 3 is a perspective view of the stand, the legs of the stand being fully extended.
Figure 4:
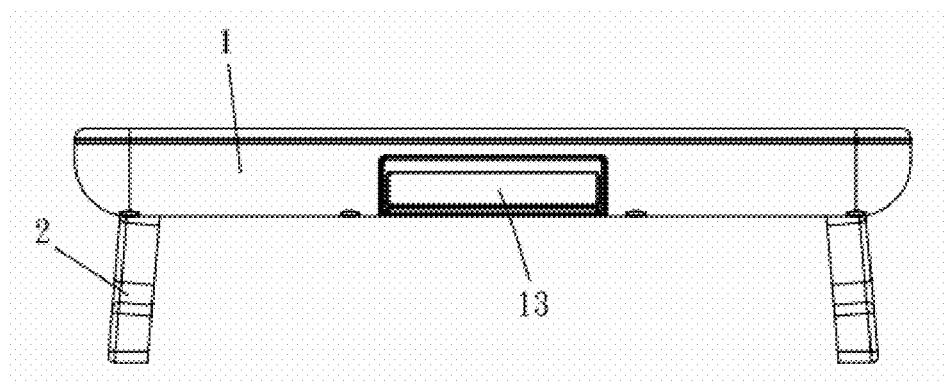
FIG. 4 is front view of FIG. 3.
Figure 5:
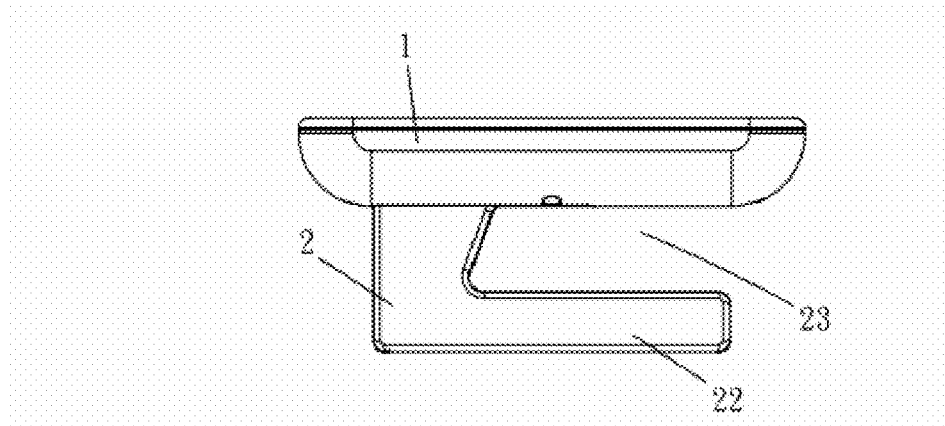
FIG. 5 is a side elevation of FIG. 3.
Figure 6:
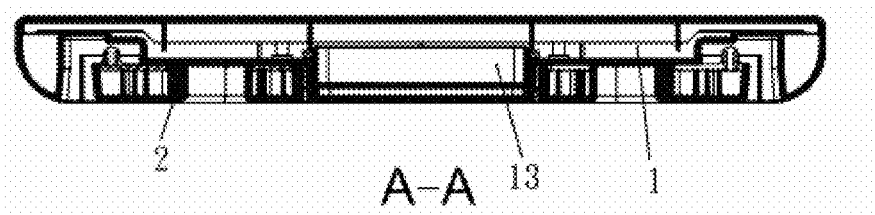
FIG. 6 is a sectional view taken along line A-A of FIG. 1.
Figure 7:
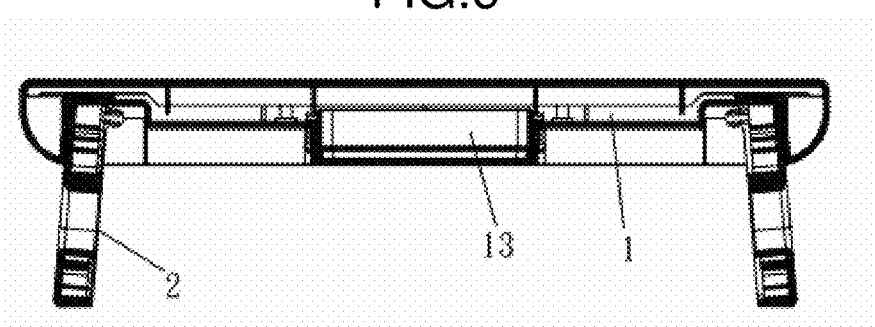
FIG. 7 is a view similar to FIG. 6 with the legs being fully extended.
Figure 8:
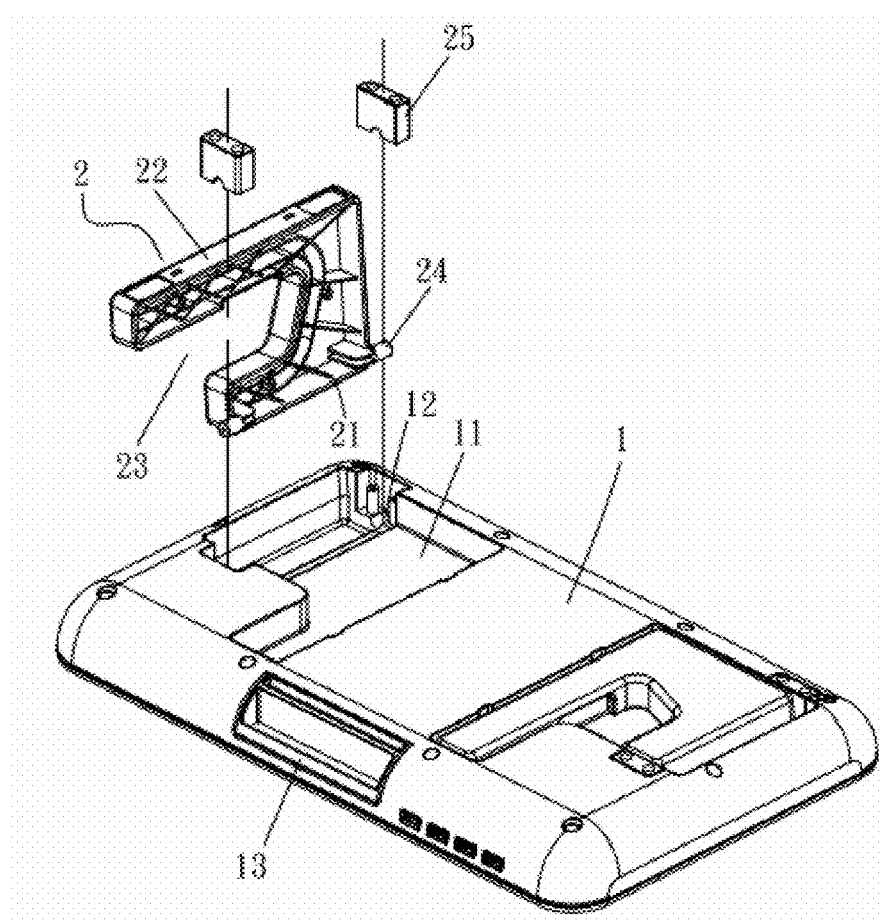
FIG. 8 is an exploded, perspective view of the stand.

Referring to FIGS. 1 to 8, a folding stand in accordance with the invention comprises a panel 1 and two opposite legs 2 under the panel 1 as discussed in detail below.

The panel 1 includes two cavities 11 adjacent to two sides of a bottom respectively, two wells 12 in front and rear ends of the cavity 11 respectively, and a tray 13 retractably disposed between the cavities 11.

The leg 2 include a short part 11, an elongated part 22 formed with the short part 11, an open recess 23 between the short part 21 and the elongated part 22, two pivots 24 extending forwardly and rearward from the short part 21 respectively, the pivots 24 being rotatably disposed in the wells 12 respectively, and two mounts 25 put on the pivots 24 and releasably secured to the cavities 11 respectively. Thus, the leg 2 may retract into the cavity 11 or extend out of the cavity 11 by pivoting with respect to the wells 12.

In a folded position, the legs 2 are disposed in the cavities 11 and in a use position, the legs 2 are extended.

Figure 9:
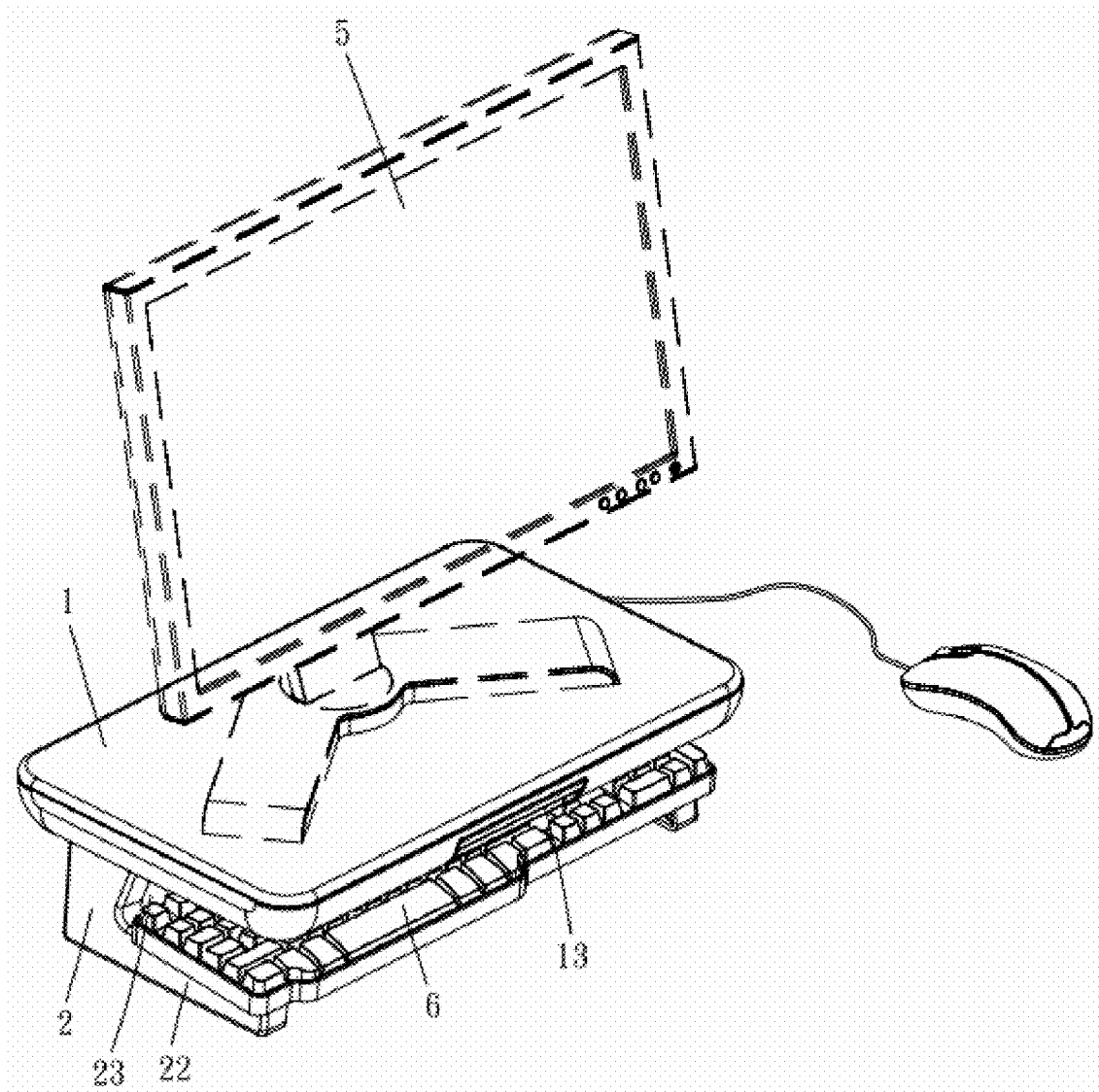
FIG. 9 is a perspective view of the extended stand with a computer monitor being placed on the stand, and a keyboard being disposed in the stand.

Referring to FIG. 9, in a first configuration of the extended stand, the stand is configured to accept a keyboard 6 disposed in the open recesses 23 under the panel 1 and supported by the elongated parts 22, and further configured to support a computer monitor 5 placed on the panel 1.

Figure 10:
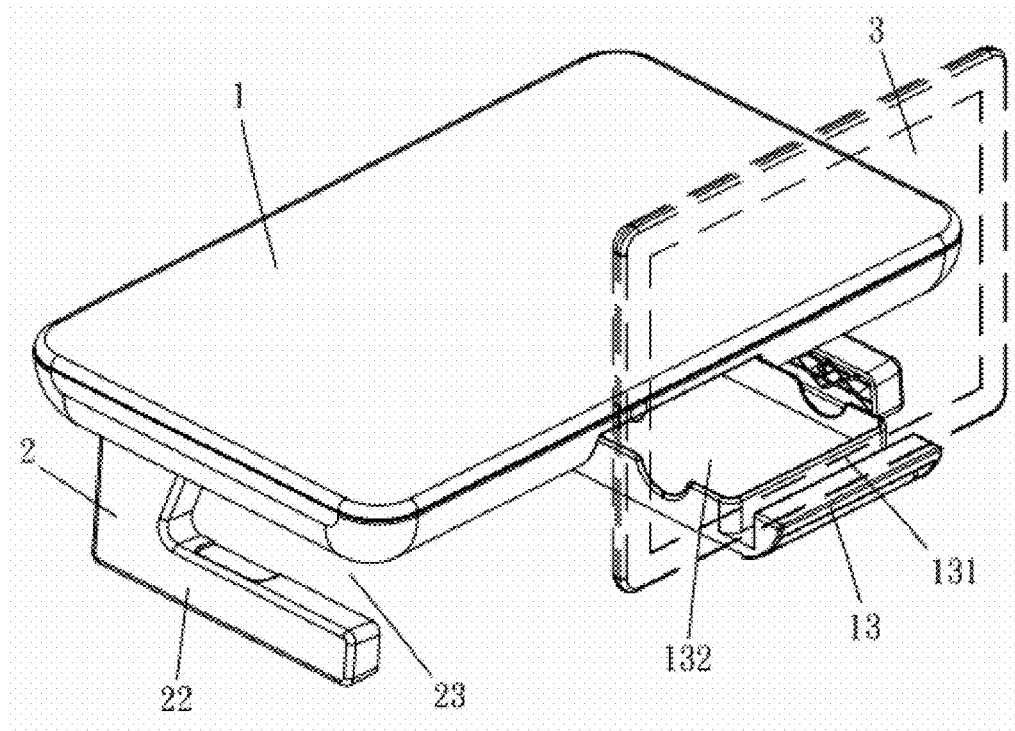
FIG. 10 is a perspective view of the extended stand with a tablet computer being supported by the stand.

Referring to FIG. 10, in a second configuration of the extended stand, the tray 13 pulled out so that a tablet computer 3 may be supported by a transverse groove 131 at a front end. Further, articles may be placed in a receptacle 132 for storage.

Figure 11:
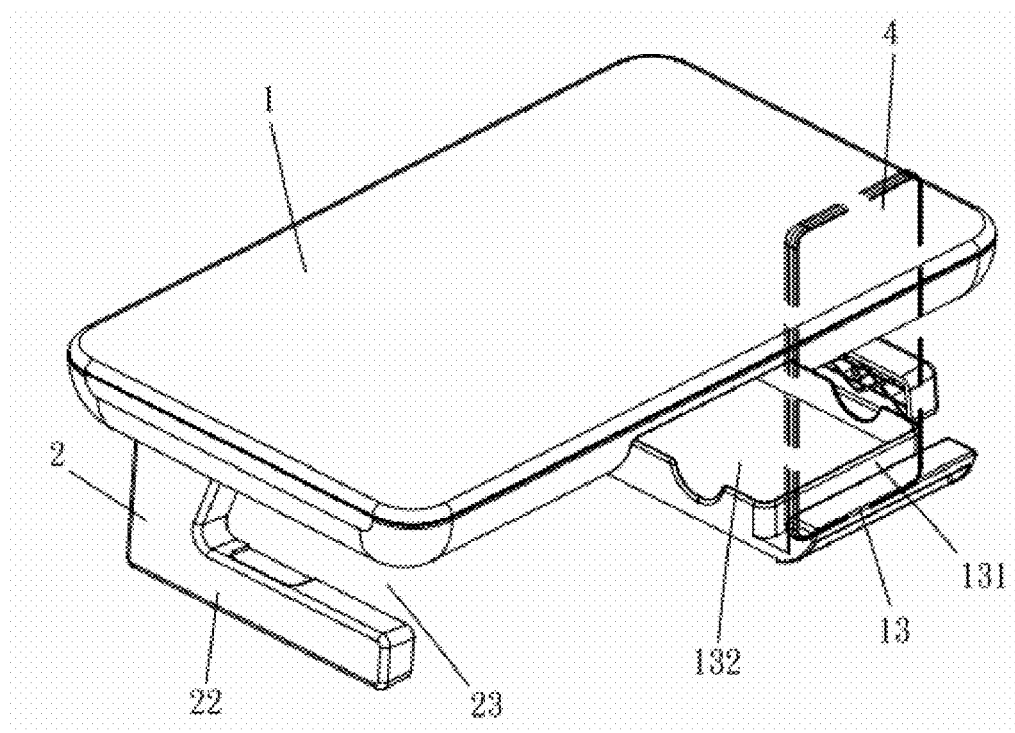
FIG. 11 is a perspective view of the extended stand with a mobile phone being supported by the stand.

Referring to FIG. 11, in a third configuration of the extended stand, the tray 13 pulled out so that a mobile phone 4 may be supported by the transverse groove 131.

While the invention has been described in terms of preferred embodiments, those skilled in the art will recognize that the invention can be practiced with modifications within the spirit and scope of the appended claims.

What is claimed is:

1. A folding stand comprising:
    a panel including two cavities each adjacent an opposed side of a bottom of the panel, respectively, and two wells arranged in front and rear ends of each cavity respectively and
    two legs each including a short part, an elongated part formed with the short part, an open recess between the short part and the elongated part, two pivots extending forwardly and rearwardly from the short part, wherein the pivots are rotatably disposed in the respective wells, and two mounts releasably securing the pivots within the respective wells,
    wherein the open recess is configured to accept a keyboard and the elongated parts are configured to support the keyboard.

2. The folding stand of claim 1, wherein each of the legs is configured to retract into and extend out of each of the respective cavities by pivoting with respect to the wells.

3. The folding stand of claim 1, wherein the panel further comprises a tray retractably disposed between the cavities, the tray including a receptacle and a transverse groove at a front end of the tray.

* * * * *